Jan. 14, 1969 A. APPEL 3,421,672
CONTROL APPARATUS FOR A RECORD
CARRIER TRANSMITTING DEVICE
Filed Oct. 19, 1966 Sheet 1 of 3

INVENTOR.
ARNE APPEL
BY
Frank R. Trifari
AGENT

INVENTOR.
ARNE APPEL
BY Frank R. Trifari
AGENT

INVENTOR.
ARNE APPEL
BY Frank R. Trifari
AGENT

United States Patent Office 3,421,672

Patented Jan. 14, 1969

3,421,672

CONTROL APPARATUS FOR A RECORD CARRIER TRANSMITTING DEVICE

Arne Appel, Salzburg, Austria, assignor to North American Philips Company Inc., New York, N.Y., a corporation of Delaware Filed Oct. 19, 1966, Ser. No. 587,781

Claims priority, application Austria, Oct. 25, 1965, A 9,633/65

U.S. Cl. 226—92 9 Claims

Int. Cl. G03b *1/56*

ABSTRACT OF THE DISCLOSURE

Apparatus for a recorder/reproducer which insures that a transmitting device for conveying a record carrier from a supply magazine to a take-up magazine is not actuated during one of the operating conditions of the recorder/reproducer. Mechanical and electromechanical devices are provided which automatically terminates the operating conditions of the recorder/reproducer prior to initiating operation of the transmitting device.

Figure 1:
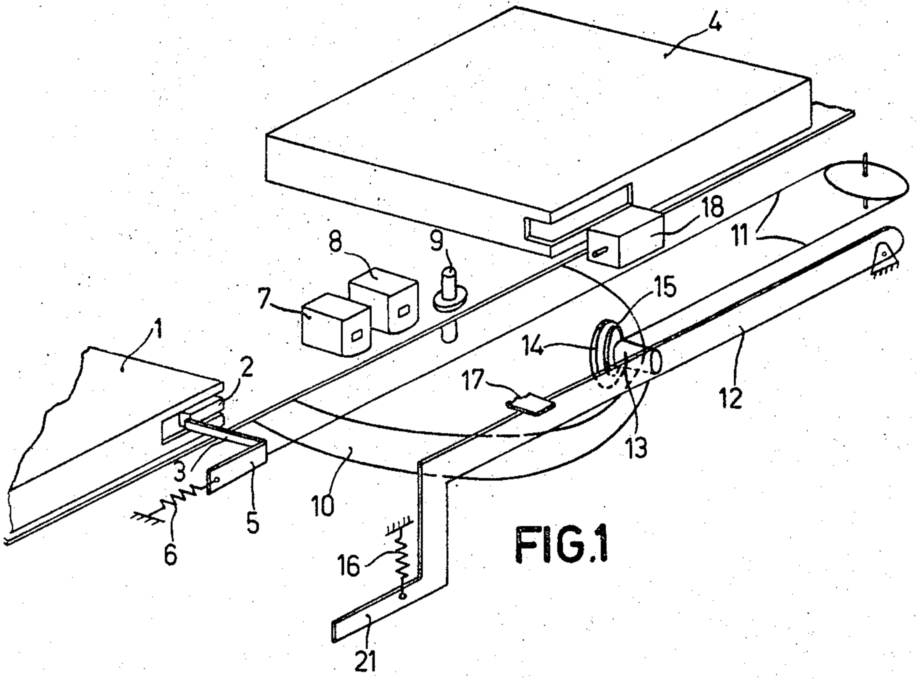

The invention relates to a recording and/or reproducing apparatus for tape- or wire-shaped record carriers. A record carrier transmitting device is provided which moves between a supply magazine and a take-up means and which is adapted to grip a tag attached to the record carrier for conveying the tag to the take-up means. The transmitting device is driven by a driving gear of the apparatus through a coupling operable by an operating device.

An apparatus for transmitting the record carrier should not be operated during the period the record carrier is scanned or when the driving gear of the apparatus for actuating said transmitting device is moving the record carrier forwards or backwards.

The invention has for its object to provide absolute protection from erroneous actuation of the apparatus during the conveyance of the tag.

According to the invention the operating device for engaging and disengaging the coupling is interlinked with a second operating device provided in the apparatus for controlling different modes of travel of the record carrier and/or operational conditions of the apparatus. The operating device for engaging and disengaging the coupling is operable only when the second operating device is in its rest-position. By this measure it is ensured in a particularly simple manner that the device for transmitting the tag can be actuated only when none of the different modes of travel of the record carrier and/or operational conditions of the apparatus are made operative, so that it is absolutely safeguarded that the actuation of the transmitting device cannot disturb the operation of the apparatus.

If such separate releasing member is provided, it is also possible and advantageous to construct it additionally as an operating member for the coupling, the latter operating member having a stroke being divided into two portions so that in the first portion of said stroke the holding member is released and in the second portion the coupling is made operative. It is then advantageous to separate the two portions of the stroke by an intermediate position that can be sensed during operation of the operating member. Such a sensible division of the said stroke may be obtained in a simple manner by having said member, when actuating, pivoting successively about two axes. In this manner the leverage for the components of the apparatus to be actuated by the member is varied. Such a member can be actuated easily along the first portion of its stroke, where the leverage has a great gearing ratio, until the axis about which member pivots is in the other position, where the leverage has a smaller ratio, so that over the second portion of the stroke the member can be actuated only by considerably greater force. This change of the required actuating force for the member is distinctly sensible and is characteristic of the change of function of the said operating member.

If a manually disengageable blocking member is provided for said operating member, which in blocking position blocks said operating member for carrying out the second portion of its stroke, the apparatus is safeguarded not only against disturbances due to action of the operating member for the coupling at a false moment, but also against an unintentional actuation of the operating member for the coupling and an undesired operation of the device for transmitting the tag of the record carrier.

For operating the different modes of travel of the record carrier and/or the operational conditions of recording/key systems are used which activate the apparatus upon a first actuation and which make them inoperative upon a second actuation. Push-buttons, which are held in a depressed position upon a first actuation and which are released when depressed again are typical for such a system. If such an operating device is used as a second operating device, according to an embodiment of the invention the operating device for the coupling and the second operating device are interlinked by a blocking member, which member arrests the operating device for the coupling, when an operating member of the second operating device is made operative, whilst it is released when the said operating member is made inoperative. It will be clear that it is also possible to apply the invention in this manner to operating devices of the kind described hereinbefore and in which the operating members are held in their operative positions by a common holding member.

The invention will be described in greater detail with reference to a preferred embodiment thereof illustrated in the accompanying drawing, in which FIG. 1 illustrates diagrammatically a device for transmitting a tag provided at the beginning of a record carrier from the supply magazine to a take-up magazine.

Figure 6:
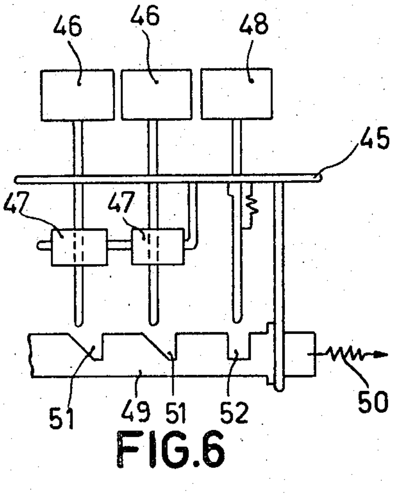
Figure 2:
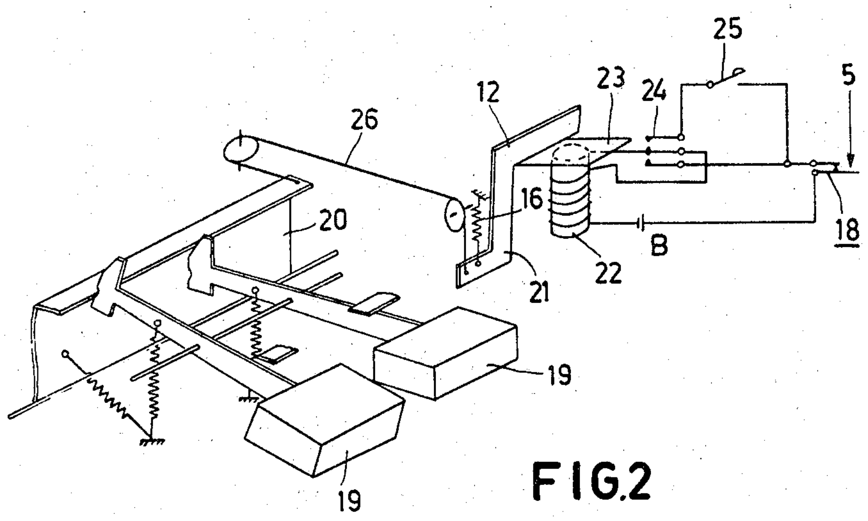
Figure 3:
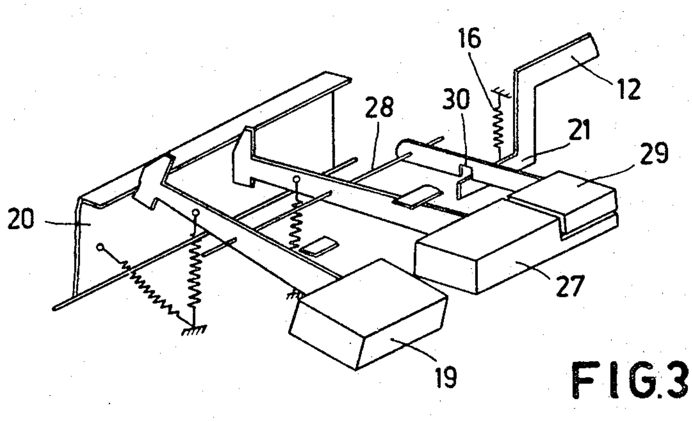
Figure 4:
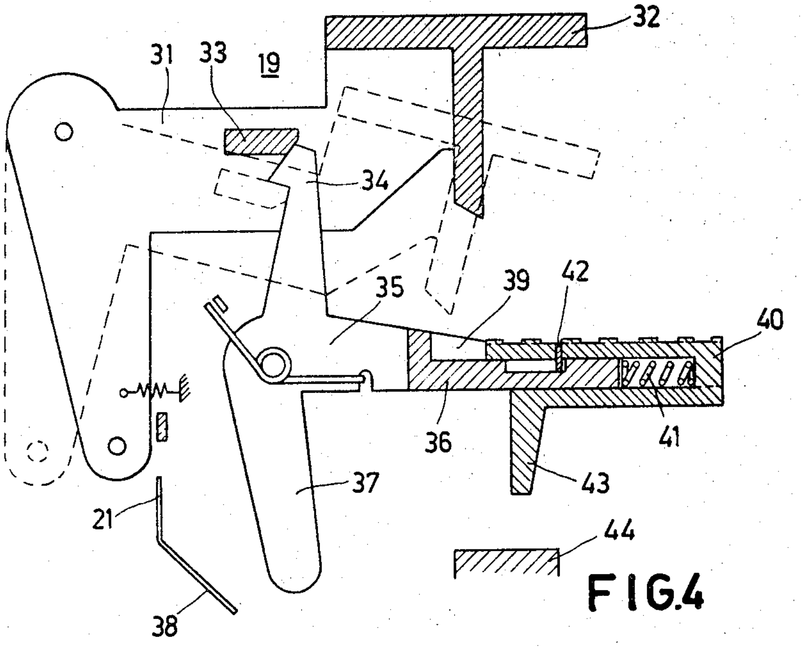
Figure 5:
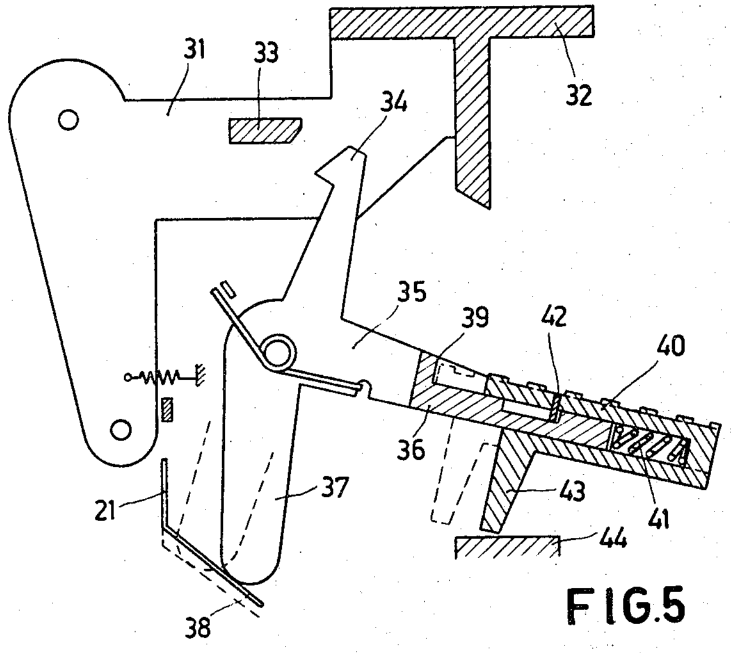

FIG. 2 illustrates a key mechanism for actuating the transmitting device of FIG. 1, FIG. 3 illustrates an alternative embodiment of a key mechanism for actuating the transmitting device of FIG. 1, FIGS. 4 and 5 illustrate a particular embodiment of a push-button for a recording/reproducing apparatus in accordance with the invention, and FIG. 6 illustrates another embodiment of a key mechanism for actuating a record carrier transmitting device.

Referring to FIG. 1 reference 1 designates a magazine comprising a supply spool for a record carrier. At one end of the record carrier a tag 2 is provided, which can be gripped by a gripper 3 and be conveyed to a take-up spool in magazine 4. The gripper 3 is attached to a driver 5, the rest position of which is located at the supply spool 1 and is determined by a reset spring 6. The record carrier is transported by the driver 5 from the supply magazine 1 to the take-up magazine 4. Adjacent the path traversed by the record carrier are a pair of magnetic heads 7 and 8 and a drive shaft 9. During operation, for example, recording or reproduction, the record carrier is urged against the magnetic heads 7–8, and against the drive shaft 9 by means such as pressing plates, pressure rollers and the like, the latter of which is omitted for the sake of clarity. It is clear that the path of the gripper 3 is obstructed when the pressure rollers or the like are in an operative position. An attempt to move the gripper 3 in either direction between the magazines 1 and 4 under these conditions will give rise to disturbances and may even lead to damage of the apparatus.

The transfer of the driver 5 with the gripper 3 from the magazine 1 to the magazine 4 is performed by a drive element of the apparatus, and more particularly by the flywheel mass 10 of the drive shaft 9 for the record carrier. For this purpose the driver 5 is provided with a rope 11, which is wound on a shaft 13, fixed to a lever 12. The coupling of the shaft 13 with the flywheel 10 is formed by a couplnig wheel 14 on the shaft 13. This wheel is not rigidly fixed to the shaft 13, but it is connected herewith by a friction coupling (slip coupling) represented here by a wheel 15. In order to establish the connection with the flywheel 10, the lever 12 is pivoted out of its rest position, which is determined by a spring 16 and a stop 17, until the wheel 14 contacts the flywheel 10 with the required pressure. The coupling devices required for returning the lever 12 and hence for engaging and disengaging the wheel 14 and the flywheel 10 are not shown in FIG. 1. It will be obvious that for the construction of such coupling devices numerous mechanical and electrical variants may be designed. This also applies to the construction of the device for gripping and transmitting the tag 2 and to the drive of the apparatus.

The slip coupling between the coupling wheel 14 and the shaft 13 obviates the need for the disconnection of the coupling wheel 14 to be performed just when the driver 5 has reached its end position adjacent the magazine 4. The slip coupling between the shaft 13 and the coupling wheel 14 may be omitted, if the wheel is urged against the mass 10 with such a pressure that the wheel 14 slips when a higher resistance is met on the shaft 13. However, the coupling may be disengaged automatically, when the driver 5 has reached its end position. FIG. 1 shows a switch 18, actuated by the driver 5 as it approaches the magazine 4 and is suitable for use with a member for electromagnetically disengaging the coupling. In order to avoid repetitions in the following description of embodiments of the invention, the arrangement shown in FIG. 1 is taken as a basis, if not mentioned otherwise.

In the embodiment shown in FIG. 2 the various operational conditions of the apparatus are made operative by spring-controlled keys 19, which are in contact, in their depressed position, with a pivotable, spring-controlled holding bar 20, the latter being pivoted upon depression of the keys, so that already depressed keys are released before a key depressed sequentially has reached its depressed position. The elements for transferring the motion of the keys to the components of the apparatus to be displaced for making operative the operational conditions of the apparatus or the different modes of travel of the record carrier is not illustrated in the figures, since it is unessential for the present invention. Of the arrangement of FIG. 1 in FIG. 2 only the end 21 of the lever 12 is shown, by means of which the coupling wheel 14 is engaged or disengaged. The lever 12 is pivoted by an electromagnet 22. For this purpose the lever 12 is provided with a plate 23, forming an armature for the electromagnet 22. The current circuit fed by the source B of the electromagnet 22 includes a pushbutton switch 25. Through a rope 26 the end 21 of the lever is connected with the holding bar 20 so that, when the electromagnet 22 is energized, the lever 12 is pivoted thereby engaging the coupling wheel 14 with the flywheel and releasing the holding bar 20 from the keys. Dimensions for the various elements are chosen such that the holding bar 20 is released before the coupling wheel 14 comes into contact with the flywheel 10.

A brief depression of the switch 25 is sufficient to engage the coupling and the coupling is disengaged automatically as soon as the driver 5 has reached a position adjacent the magazine 4, since in the current circuit of the electromagnet 22 there is provided a second switch 18, referred to in FIG. 1 and a switch 24 which is changed over when the armature 23 is attracted, so that a holding current circuit is closed, which circuit is interrupted when the contact of switch 18 opens.

In the embodiment shown in FIG. 3 the operating arrangement comprises apart from the keys 19 for making operative the operational conditions of the apparatus and/or the different modes of travel of the record carrier a release key 27, which serves to release the holding bar 20 without maintaining contact therewith. In order to engage the coupling wheel 14, the lever end 21 must be depressed. A coupling key 29 is provided which serves to actuate the coupling operating device. This key 29 overlies the key 27 and is attached to a common shaft 28. Key 29 bears on and pivots key 27 when key 29 is depressed. The end 21 of the lever 12 extends beneath the key 29, so that depressing the latter also depresses the end 21 of the lever 12. However, a recess 30 in the lever of the key 29 permits the lever 12 to be pivoted after the key 29 has released the other keys, for example, the key 19.

In the embodiment shown in FIGS. 4 and 5 the keys 19 of the operating arrangement for initiating the operational conditions of the apaparatus and/or the different modes of travel of the record carrier are each formed by two plates 31, which are interconnected by the key body 32 and a transverse connection 33. This connection 33 is engaged by a hook 34 of a holding member 35 when the key 19 is depressed. The hooks 34 are arranged side by side to correspond with the keys 19. At the front the holding member 35 includes a key plate 36, which extends transversely beneath the keys 19. The holding member 35 further includes a lever 37, by means of which the end 21 of the lever 12, which extends in the longitudinal direction of the operating arrangement as far as beneath said lever 37, is depressed, so that the coupling wheel 14 is engaged, when the holding member is turned sufficiently by the depression of the key plate 36. For this purpose the end 21 of the lever has an oblique face 38, along which the lever arm 37 is adapted to slide. This position is shown by broken lines in FIG. 5.

The hook 34 is so arranged with respect to the transverse rods 33 and the lever arm 37 and the bevelled side 38 that the overall stroke of the key plate 36 is divided into two portions, each portion having a different function. During the first portion of the stroke the depressed keys 19 are released and during the second portion of the stroke the coupling wheel is engaged. It is advantageous to provide an intermediate position in the stroke, which indicates during the actuation of the key plate 36 that the depressed keys are released prior to engaging the coupling. This may be constructed so that the key plate 36 after releasing the holding member has to be moved in a different direction for effecting coupling engagement.

In the embodiment shown in FIGS. 4 and 5 a channel shaped slide 40 attached to and partially surrounds the key plate 36. A spring 41 is interposed the slide and the key plate which tends to urge the slide towards the outer edge of the key plate 36. A stop pin 42 determines the position of the slide 40 relative to the key plate. On the lower side the slide 40, an extension 43 is located which comes into contact with a stop 44 of the recording apparatus, when the key plate 36 is depressed. Pivotal movement of the key plate 36 to the position where movement is limited by the stop 44 is sufficient to release the depressed keys 19. The lever 12 cannot be pivoted further (FIG. 5) until the slide 40 is moved into the position indicated by broken lines in FIG. 5. The extension 43 no longer prevents further depression of the key plate 36. Hence, lever 37 abuts face 38 at the lever end 21 thereby effecting engagement of the coupling 14.

Thus, the drive mechanism cannot transmit the tag from the supply spool to the take-up spool until the keys for initiating the operating conditions of the apparatus and/or different modes of travel of the record carrier are released. Also, only intentional operation of the slide 40 will make the coupling operative.

FIG. 6 shows diagrammatically an arrangement in which the operational conditions of the apparatus and/or the different modes of travel of the record carrier are operated by means of keys 46 mounted in a plate 45. The arrangement includes members 47 by which the separate keys, when first depressed, are held in the depressed positions, while they are released when depressed again. At the side of the keys 46 there is provided a key 48 which serves as a coupling operating device. The latter acts again, as described hereinbefore upon the end of a lever so that, when the key 48 is depressed, also the end of the lever is pressed down. Between the keys 46 and 48 a rod 49 is displaceably arranged, below the keys and forms a connection such that the key 48 can be depressed only when the keys 46 are released. For this purpose the rod 49 has a rest position which is determined by a spring 50. The rod 49 is provided with recesses 51 and 52, which are located both beneath the keys when the rod 49 is in the rest position. The edges of the recess 51 extend obliquely on the side remote from the spring 50, so that the rod 49 is displaced against the force of the spring 50 when any of the keys 46 are depressed. When a key 46 is depressed, the recess 52 is no longer located beneath the key 48, hence, upward movement of the latter is blocked. Thus coupling can be made operative only when none of the keys 46 is depressed. As a matter of course, such blocking may also be used for keys held by a common holding bar in their operative position.

What is claimed is:

1. A recording/reproducing apparatus having a supply magazine, a take-up magazine, a transmitting device for conveying a tag attached to a record carrier from said supply magazine to said take-up magazine and a drive element for driving said transmitting device comprising: means for operating said transmitting device, said means including a coupling for engaging said drive element of said recorder/reproducer; means for controlling the operational conditions of said recorder/reproducer apparatus, said controlling means having a rest position and a position for activating said recorder/reproducer apparatus; means for initiating said means for operating said transmitting device when said controlling means is in a rest position; said means for operating said transmitting device further comprising a pivotal lever attached to said coupling, and means for normally holding said coupling out of contact with said drive element; and said means for controlling the operational conditions of said recorder/reproducer comprising a plurality of keys, said keys being movable from a rest position to a position for activating said recording/reproducing apparatus; and means for holding said keys in said activating position.

2. A recording/reproducing apparatus according to claim 1 wherein: said means for initiating said means for operating said transmitting device includes means for releasing any of said plurality of keys from an activating position prior to initiation.

3. A recording/reproducing apparatus according to claim 1 wherein: each of said keys of said plurality of keys includes a latching means thereon, and said means for holding said keys in said activating position engages said latching means when each of said keys is moved to said activating position.

4. A recording/reproducing apparatus according to claim 3 wherein: said means for initiating said means for operating said transmitting device further comprises a first switch, a power source connected to said first switch, an electromagnet connected to said first switch, an armature adjacent said electromagnet and cooperating therewith connected to said pivotal lever, and means interconnecting said means for holding said keys in said activating position and said pivotal lever, wherein said pivotal lever and said armature are attracted to said electromagnet when said first switch is activated thereby releasing said means for holding said keys in said activating position from engagement with said keys and moving said coupling into contact with said drive element.

5. A recording/reproducing apparatus according to claim 4 wherein: said means for initiating said means for operating said transmitting device further comprises a second switch means for interrupting the connection between said electromagnet and said first switch after said tag has been conveyed to said take-up magazine.

6. A recording/reproducing apparatus according to claim 3 wherein: said means for initiating said means for operating said transmitting device further comprises a release key adjacent siad means for holding said keys in said activating position, said release key being movable in a first direction to release from latching engagement, said means for holding said keys in said activating position and a coupling key adjacent said release key and said pivotal lever, said coupling key being movable into contact with said lever to pivot said lever and move said coupling into engagement with said drive element and to move said release key in said first direction.

7. A recording/reproducing apparatus according to claim 3 wherein: said means for initiating said means for operating said transmitting device comprises a pivotal key plate extending transversely of said plurality of keys, and a second lever attached to said key plate positioned adjacent said pivotal lever, said means for holding said keys in an activating position comprises a plurality of hook elements attached to said pivotal key plate, wherein said hook elements engage said latching elements on any of said keys of said plurality of keys when said keys are moved to said activating position, and said hook elements release any of said engaged keys when said key plate is moved to a first position; and wherein said second lever pivots said pivotal lever to engage said coupling to said drive element when said key plate is moved to a second position.

8. A recording/reproducing apparatus according to claim 7 further comprising: a slide element attached to said key plate and relatively movable therewith; and a stop means attached to said recording/reproducing apparatus and positioned adjacent said slide element, wherein the movement of said key plate to said first position abuts said slide element against said stop means and said abutment between said extension and said stop means is terminated by movement of said slide element relative to said key plate, and wherein said key plate is movable to said second position after said abutment is terminated.

9. A recording/reproducing apparatus according to claim 3 wherein: said means for initiating said means for operating said transmitting device includes a movable coupling key; said means for holding said keys in said activating position comprises a rod means extending transversely of said keys and a biasing means for holding said rod means in a first position; said rod means includes a plurality of cam means and a coupling key connection thereon, with each of said cam means being normally aligned with respect to one of said keys and said coupling key connection is normally aligned with said coupling key; each of said keys engages said cam means upon actuation with said engagement moving said rod to a second position; to misalign said coupling key connection with said coupling key thereby precluding actuation thereof.

References Cited

UNITED STATES PATENTS

| | | | |
|---|---|---|---|
| 3,104,843 | 9/1963 | Missriegler et al. | 242—55.13 |
| 3,154,236 | 10/1964 | Louzil | 226—92 |
| 3,195,792 | 7/1965 | Louzil | 226—92 |
| 3,195,825 | 7/1965 | Louzil | 226—92 X |
| 3,311,314 | 3/1967 | Louzil | 242—55.13 |

ALLEN N. KNOWLES, *Primary Examiner.*

U.S. Cl. X.R.

242—55.13